United States Patent

Payne

[11] 4,016,762
[45] Apr. 12, 1977

[54] TEMPERATURE INDICATOR
[75] Inventor: William J. Payne, Greensburg, Pa.
[73] Assignee: Modulus Corporation, Chagrin Falls, Ohio
[22] Filed: Sept. 2, 1975
[21] Appl. No.: 609,374
[52] U.S. Cl. .............................. 73/358; 116/114.5
[51] Int. Cl.² ...................................... G01K 11/12
[58] Field of Search ......... 73/356, 358; 116/114 V, 116/114.5

[56] References Cited
UNITED STATES PATENTS

| | | | |
|---|---|---|---|
| 2,230,047 | 1/1941 | Eastburg | 73/358 UX |
| 2,503,593 | 4/1950 | Pearce et al. | 73/358 |
| 3,090,236 | 5/1963 | Nicol | 73/358 |
| 3,442,249 | 5/1969 | Jamison et al. | 116/114.5 |
| 3,518,961 | 7/1970 | Kovac | 116/114.5 |
| 3,569,695 | 3/1971 | McLean | 116/114 V X |
| 3,877,306 | 4/1975 | Heinmets | 73/358 |
| 3,877,411 | 4/1975 | MacDonald | 116/114.5 |

Primary Examiner—Jerry W. Myracle
Assistant Examiner—Joseph W. Roskos
Attorney, Agent, or Firm—Fay & Sharpe

[57] ABSTRACT

A temperature indicator of the type wherein the heating of the indicator to a predetermined temperature produces a change in color of a visual indicator. An indicator area and a light-absorbing indicator fluid are sealed in a fluid holding member that also includes a window. The fluid holding member is fastened to the temperature indicator. At such time as the temperature indicator reaches a predetermined temperature, a portion of the sealing wall of the fluid holding member is caused to be interrupted with the result that fluid is caused to flow out of the fluid holding member thereby producing a visual indication through the window of the indicator that a high temperature limit has been reached.

12 Claims, 6 Drawing Figures

TEMPERATURE INDICATOR

BACKGROUND OF THE INVENTION

This invention relates to temperature indicators and more particularly to apparatus of the type wherein the heating of an indicator to a predetermined temperature produces a change in color of a visual indicator.

While the invention of this application has broad uses in those areas where it is desired to give an indication as to when a temperature limit has been reached, the preferred embodiment is directed more particularly to temperature indicating fasteners.

One application of a temperature indicating fastener that has received some attention in the prior art is that with respect to railroad axle bearings.

A typical manner of mounting a railroad car body is to support such body on a pair of truck units. Generally, each truck unit includes a pair of longitudinally spaced axles having exteriorly projecting journal portions. Each axle is rotatably mounted to the truck by means of a pair of bearing assemblies.

A typical bearing assembly will be pressed on the railroad car axle as a completely sealed and prelubricated unit. This assembly will include a bearing, an axle end cap, a plurality of cap screws and a locking plate. The cap screws are adapted to be received in tapped holes provided in the axle.

For obvious reasons it is desirable to be able to detect an overheating condition in a railroad axle bearing. The presence of excessive heat not only causes lubricant to be dissipated but, in extreme conditions, may also result in a seizing of the bearing.

Accordingly, it has been known in the prior art to provide some means for indicating temperature in one or more of the bolts used in association with the bearing assembly in a railroad car axle. It follows that as heat is generated by a bearing it will be transmitted to the axle and subsequently to the fastener of the bearing assembly since such fastener is directly received in the axle.

One example of a prior art effect toward providing a temperature indicator in a railroad bearing bolt is shown in U.S. Pat. No. 3,442,249 to Jamison et al. In the Jamison structure a fusible material is provided in the bolt head such that when the bolt overheats the material will be caused to melt and flow outwardly thereby permitting detection of overheating of the roller bearing unit of the axle merely by visual inspection.

Another structure of the prior art is described in U.S. Pat. No. 3,877,411 to MacDonald. MacDonald teaches the application of a heat sensitive chemical wafer or disc to a recessed portion of the head of a bolt. When the bolt is heated to a temperature that exceeds the predetermined temperature limit for the bolt, the disc of the bolt head will change color thereby giving a visual indication of the fact that a specific temperature limit has been reached.

Other signalling devices have been used in the prior art in connection with railroad axle bearings including devices designed to emit smoke or noxious odors at such time as the bearing has reached a predetermined critical temperature.

This invention is directed to a temperature indicator for particular use and adaptation in bearing bolts and wherein there is provided a means for sensing a temperature limit having been reached that does not rely on either a heat sensitive chemical or other materials of the type described above.

SUMMARY OF THE INVENTION

Briefly summarized, the temperature indicator of this invention comprises a threaded bolt having a head and a recess extending from the head into the bolt body. A fluid holding member is received within the recess of the head. The fluid holding member includes a window which is disposed near the head of the bolt in a manner so as to be visible to an observer. An indicator area and light-absorbing indicator fluid are received within the fluid holding member. The sealing wall of the fluid holding member is provided with a plug material that is adapted to melt and flow at a specific temperature. When the indicator is heated to the critical temperature the sealing wall of the fluid holding member is caused to be interrupted as the low melting plug material is caused to melt and flow. This causes the fluid in the fluid holding member to flow out of the fluid holding member thus producing a visual change in color at the window of the indicator.

BRIEF DESCRIPTION OF THE DRAWINGS

A more complete description of the invention will now be made with reference to the accompanying drawings in which.

DESCRIPTION OF THE PREFERRED EMBODIMENT

Figure 1:
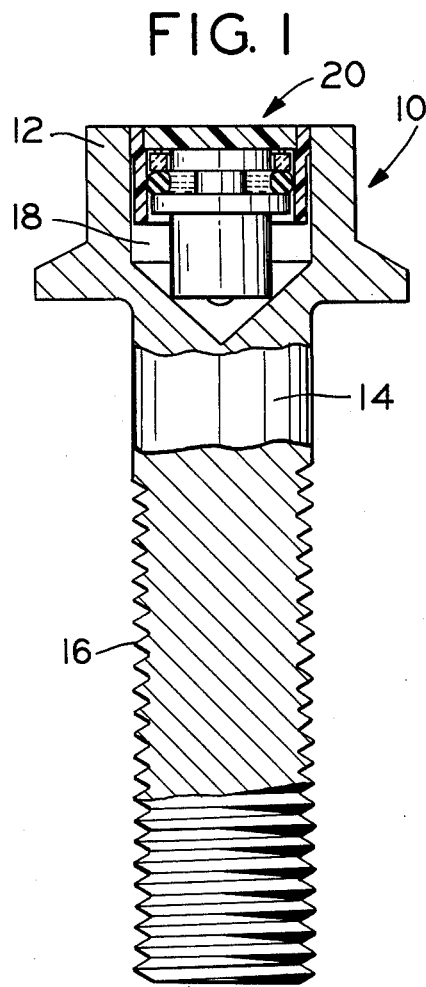
FIG. 1 is an enlarged elevational view, partly in section, of the preferred embodiment of the temperature indicator of this invention shown in relation to a fastener.

Turning now to FIG. 1, the preferred embodiment of the apparatus of this invention is shown in relation to a fastener 10 which includes a head 12, a shank portion 14 and external threads 16. Head 12 may be in any desired configuration making it possible to turn the fastener with a suitable tool such as a wrench.

A recess 18 is defined within head 12 in order to receive the temperature indicator generally shown at 20.

Figure 2:
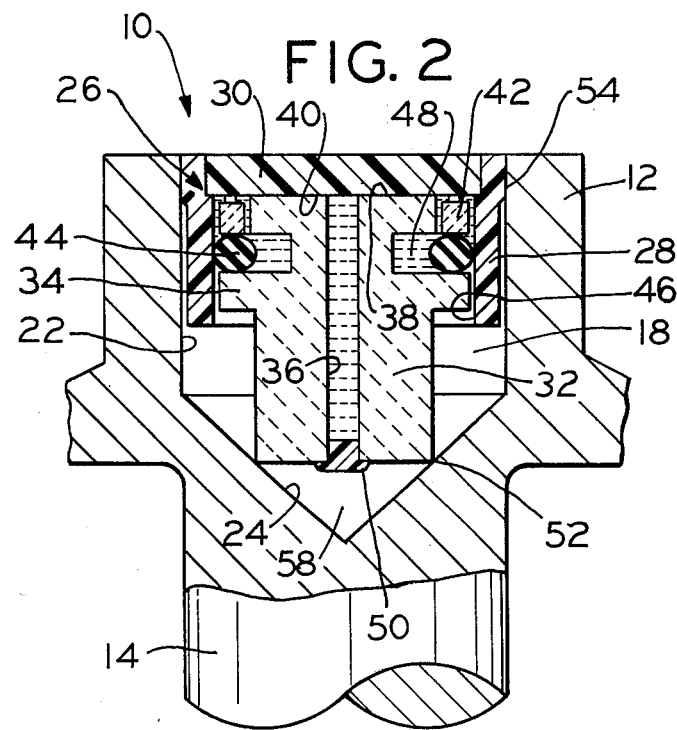
FIG. 2 is an enlarged fragmentary elevational cross-sectional view of the preferred embodiment of the apparatus of this invention shown with the fastener in an unstressed condition.

As is shown more clearly in FIG. 2, recess 18 is generally defined by a vertical interior side wall 22 and a bottom wall 24.

A fluid holding member 26 is generally disposed within recess 18 as will be noted in FIG. 2. Fluid holding member 26 is defined by a side wall 28 and window 30 secured to side wall 28 in a sealed relationship. In the preferred embodiment window 30 is fabricated from the clear plastic, Lexan. It should be appreciated, however, to those skilled in the art that other materials may be used for purposes of defining the window including, but not limited to, other plastics and glass. Similarly the side wall 28 may be fabricated from a variety of materials including plastic, glass or metal although, in the preferred embodiment of FIG. 2, side wall 28 is fabricated from Lexan material, a clear plastic, and is bonded to window 30.

Disposed partially within the fluid holding member 26 is the indicator member 32. As will be noted from FIG. 2, indicator member 32 is generally cylindrical in shape and includes a radially extending shoulder 34 and a bore 36 extending through the indicator member at essentially the center line thereof. The upper surface portion of indicator member 32 is provided with a brightly colored indicator area 38 which is essentially planar and complementary to the inner wall 40 of window 30. In the preferred embodiment indicator area 38 is defined by a highly visible red-orange color.

Also disposed within the fluid holding member is a generally annular reference ring 42 and a sealing and bias element 44. In the preferred embodiment as shown in FIG. 2 the sealing and bias element 44 is defined by an elastomeric O-ring. This element is adapted to sealingly engage shoulder 34 of the indicator member 32 and the internal wall 46 of the side wall 28.

The window, side wall 28, sealing and bias element 44 and indicator member 32 thus function to define a sealed space into which light-absorbing indicator fluid 48 is deposited.

In the preferred embodiment of this invention the light-absorbing indicator fluid 48 is of a color different from that of the indicator surface or area 38. For example, a dense blue or black fluid may be used. The particular chemical composition of the fluid may vary although in the preferred embodiment a mineral oil, into which has been dissolved a dye powder of a suitable color, is preferred.

Turning to the indicator member 32 of FIG. 2, it will be noted that a plug 50 is disposed within the end portion of bore 36 in order to provide a seal for the fluid 48 which essentially fills the entire bore 36. Plug 50 is comprised of a low melting point plastic or other suitable material and is adapted to melt and flow at a specific temperature. A further reference will be made to plug 50 as the description proceeds.

In the condition of the fastener as shown in FIG. 2 there is essentially no load imposed on the fastener and, accordingly, the indicator area 38 is in contact with the inner wall 40 of the window 30. At the same time the indicator member 32 makes contact with the bottom wall 24 of the head recess at the line of contact 52.

The fluid holding member 26 is retained within recess 18 of the bolt head by means of an interference fit created by the side wall of the bolt head 22 engaging serrations 54 defined on the exterior surface of the side wall 28 of the fluid holding member. In addition, the fluid holding member is staked into the bolt head as small amounts of bolt head material are displaced in order to firmly retain the fluid holding member in place.

Once assembled in the configuration as shown in FIG. 2 a number of relationships between the several elements of the fastener and the indicator are present. As previously noted the indicator area 38 of indicator member 32 will be in very close proximity to the inner wall 40 of window 30. Sealing and bias member 44 will be slightly compressed, in the configuration of FIG. 2, in order to exert a bias on the shoulder 34 of indicator member 32 tending to force the indicator area 38 out of contact with window 30. Finally, the indicator member 32 will be in contact with the bottom wall 24 at the line of contact 52.

At such time as a stress is imparted to the bolt during take up there will take place not only an elongation of the shank 14 of the bolt but there will also be created deformation of the bolt head causing the bottom wall 24 defining recess 18 to be displaced in a downward direction in FIG. 2.

Figure 3:
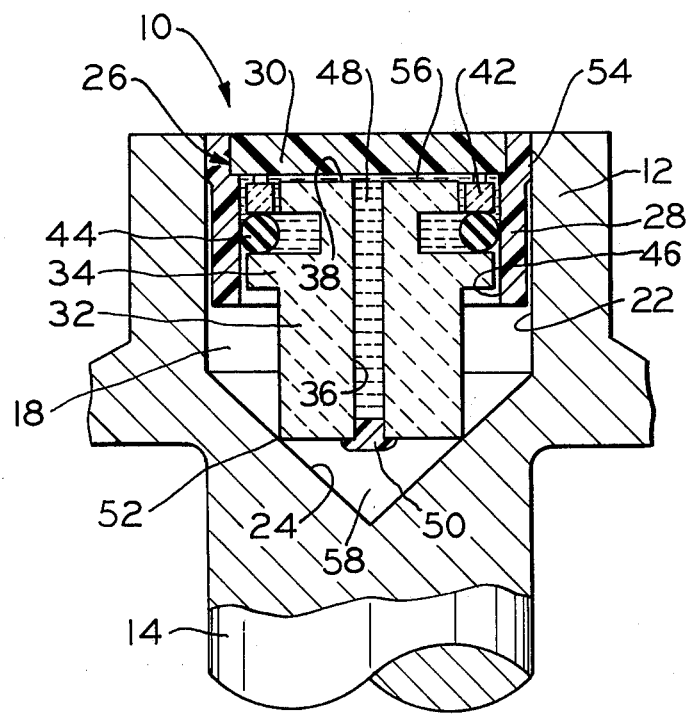
FIG. 3 is an enlarged fragmentary elevational cross-sectional view of the indicator portion of the apparatus of this invention with the fastener in a stressed condition.

As will be appreciated from a study of FIGS. 2 and 3 the movement of bottom wall 24 of the fastener head in a downward direction (which is brought about as the result of fastener take up) will cause the indicator area 38 to separate from the window producing a gap 56 between the indicator area and the window. The bias exerted on the shoulder 34 by means of the element 44 causes the indicator member 32 to follow the bottom wall 24 during take up as the line of contact 52 between these members is maintained.

In the condition shown in FIG. 3 the fastener has been taken up an appropriate amount and, accordingly, a gap 56 has been defined between the indicator area 38 and the window 30. Light-absorbing indicator fluid 48 is thus permitted to flow between the window 30 and the indicator member 32 with the result that the characteristic red-orange color of the indicator area 38 is effectively masked or obliterated to an observer by the characteristic dark blue color of the fluid.

Accordingly, while the appearance of a brightly colored indicator area through the window 30 indicates an unstressed condition of the bolt as shown in FIG. 2, the appearance of a deep blue circle through the window indicates the fact that the bolt has been taken up an appropriate amount in the configuration shown in FIG. 3.

Thus far, the description of FIGS. 1, 2 and 3 has centered not so much on the temperature indicating feature of this invention but rather on the torque indicating feature which, in the preferred embodiment of this application, is inherent in applicant's structure. For a more complete description of the torque indicating feature of the structure shown in applicant's FIGS. 1–3 reference is made to applicant's copending application Ser. No. 595,786 filed July 14, 1975.

Turning now to FIG. 3 previous reference has been made to the fact that in the condition shown the fastener has been taken up an appropriate amount.

In the event that it is desirable to determine whether the fastener has reached a particular temperature applicant has provided in the indicator member 32 a melt-out plug 50 having the physical characteristic that it will melt and flow out of the bore 36 at a predetermined temperature. For example, it may be deemed desirable to provide a visual indication of the fact the the fastener has reached a temperature of 200° F. To that end, a plug 50 fabricated from a material having a melting point of 200° F. will be selected and installed in the indicator member as shown in Fig. 3.

Therefore, at such time as the fastener reaches the predetermined temperature limit the plug 50 will be caused to melt and become dislodged from the wall defining bore 36. The fluid tight integrity of the fluid holding member will thus become interrupted and essentially all of the fluid within the bore 36 and gap 56 will be caused to drain into the void 58 defined just below the indicator member 32. As will be appreciated at such time as fluid 48 is drained from the bore 36 and gap 56 the brightly colored indicator area 38 will, once again, become visible indicating the fact that the bolt has reached a predetermined temperature limit.

In order to provide a reference point for the observer one or more reference bands of color may be provided on the exterior surface of the window 30 or the reference ring 42 may itself be colored in order to provide a fixed reference as to color enabling an observer to determine whether a specific temperature limit has been reached.

DESCRIPTION OF THE MODIFIED EMBODIMENT

Figure 4:
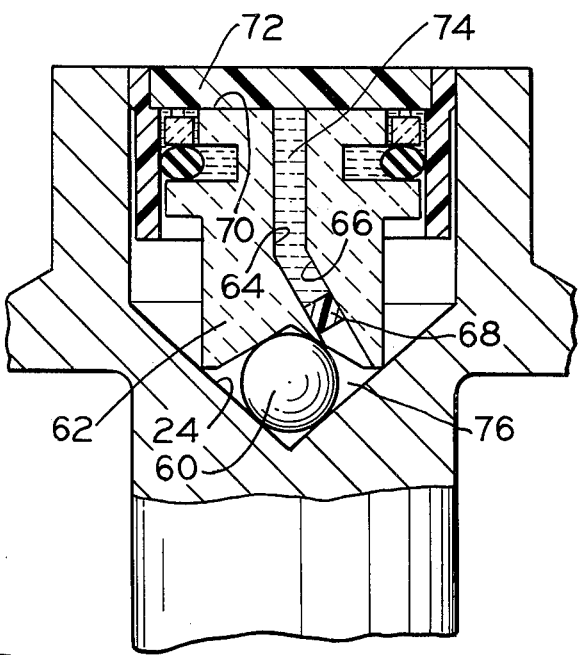
FIG. 4 is an enlarged fragmentary elevational cross-sectional view of a modification of the temperature indicator of this invention.

In FIG. 4 there is shown a modified form of the invention in which a pivot ball 60 provides an abutment surface in order to receive indicator member 62. A bore 64 is defined essentially on the center line of the indicator member 62 and is intersected by a transverse bore 66. A plug 68 having a suitable melting point is inserted in the transverse bore and functions in a manner similar to that described in connection with plug 50 of the preferred embodiment of FIG. 2.

The essential difference between the structures of FIGS. 2 and 4 resides in the fact that in the structure of FIG. 2 the indicator member makes direct contact with the wall defining the recess of the bolt head whereas in the structure of FIG. 4 the indicator member contacts the pivot ball 60 which is, itself, in contact with the wall defining the recess of the bolt head.

The operation of the modified embodiment of the invention as shown in FIG. 4 is virtually identical to that of the preferred embodiment of FIG. 2. As the fastener of the embodiment of FIG. 4 is taken up the bottom wall 24 is caused to be deflected downwardly producing the result that the indicator area 70 is caused to be displaced somewhat from the window 72 with the result that light-absorbing indicator fluid 74 is caused to flow between the indicator area 70 and the window. At such time as the bolt of FIG. 4 is heated a degree sufficient to reach the predetermined temperature limit of the material defining the plug member 68, the plug will melt and flow out of the transverse bore 66 causing fluid 74 to flow into the void 76. There will thus be a visual change at the window 72 as the characteristic color of the dark fluid is removed and the brightly colored surface of indicator area 70 appears through window 72.

Figure 5:
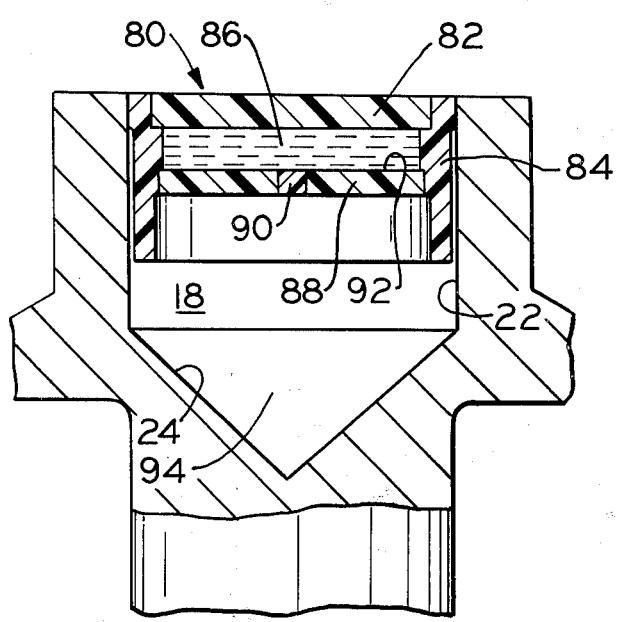
FIG. 5 is an enlarged fragmentary elevational cross-sectional view of a further modification of the temperature indicator of this invention.

A still further modification to the preferred embodiment of this invention is shown in FIG. 5. Basically, it will be noted in FIG. 5 that the torque indicating feature of the preferred embodiment of FIG. 2 has been removed entirely. The structure of FIG. 5 functions solely to indicate the presence of a temperature limit having been reached.

The bolt head of FIG. 5 is similar to that shown in connection with the preferred embodiment of FIG. 2. Such bolt head is defined by a side wall 22 and a bottom wall 24 defining a recess 18. A fluid holding member 80 is received within recess 18 in a manner such that the window 82 of the fluid holding member is visible. It will be noted from FIG. 5 that window 82 is received within and supported by a side wall 84. As in the preferred embodiment window 82 is fabricated from a clear plastic such as Lexan. Side wall 84 may similarly be fabricated from a clear plastic or any other material well known to those skilled in the art. Members 82, 84 are sealingly secured together and define a cup-shaped member into which fluid 86 is deposited. A bottom wall 88 is inserted into the fluid holding member and together with the side wall 84 and window 82 completely seals fluid 86 within the fluid holding member. A melt-out plug 90 is provided in the bottom wall 88 and is fabricated from any suitable low melting point material in the same manner as is plug 50 of FIG. 2. A brightly colored indicator area 92 is defined at the uppermost surface of bottom wall 88 as shown in FIG. 5.

Indicator area 92 is defined by a highly visible color such as red-orange. Fluid 86, like the fluid of the preferred embodiment, is a color which contrasts with the color of the indicator area such as a dark blue or black.

The indicator of FIG. 5 will normally show a deep blue or black color through the window 82 whenever the bolt is in an environment where the temperature does not exceed the predetermined temperature limit or melting point of the material defining the plug 90. At such time as the bolt is heated to the point where the melting point of the plug 90 is exceeded the fluid tight integrity of the fluid holding member will be destroyed and the fluid 86 will be caused to drain from the fluid holding member into the void 94. There will consequently be seen a change in appearance at the window 82 from the characteristic dark blue or black color emitted by the fluid to the bright, highly visible color of the indicator area 92.

In the embodiment of FIG. 5 the bottom wall 88 is fabricated of a material similar to that defining the side wall 84 and is joined to the side wall in a sealed relationship in a manner known to those skilled in the art. It should be appreciated, however, that the bottom wall 88 and side wall 84 may be integral and may, together, define a one-piece cup-shaped member adapted to receive the window 82. Alternately, the window, side wall and bottom wall may be defined as a one-piece structure using plastic molding techniques well known to those skilled in the art.

Similarly it should be appreciated that in the event it is desired to provide for expansion of the fluid 86 of FIG. 5 due to heating, suitable expansion means may be provided in the fluid holding member such as ribs or corrugations in the bottom wall 88 or in any other portion of the fluid holding member.

RAILROAD BEARING APPLICATION

Figure 6:
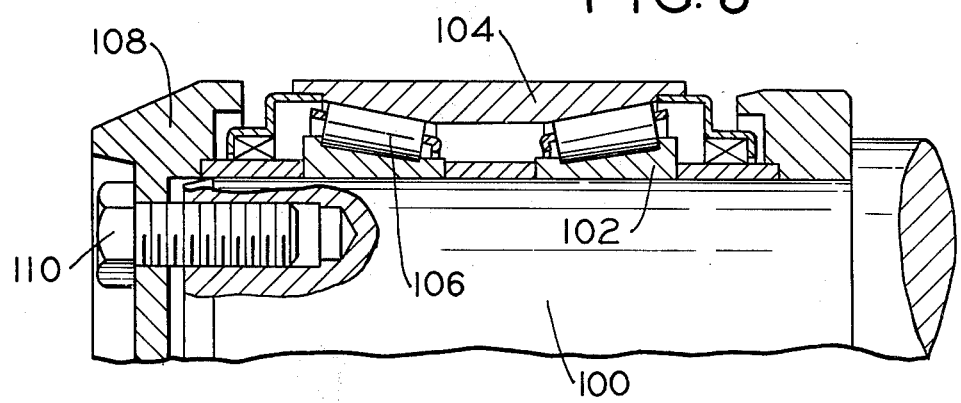
FIG. 6 is an enlarged fragmentary elevational cross-sectional view of a railroad axle bearing and showing generally the relationship of the temperature indicator of this invention to such bearing.

Turning now to FIG. 6, there is shown a typical railroad bearing in order to demonstrate the environment into which the temperature sensing fastener of this invention may be used. It will be noted from FIG. 6 that the railroad car axle 100 is pressed within the inner cone 102 of the bearing assembly. A bearing cup 104 provides support for the double row of tapered roller bearings 106 disposed therein. An end cap 108 covers the axle end and is retained in place by means of a plurality of cap screws 110 which are advanced into threaded holes defined in the axle end.

This invention is particularly applicable to fasteners used to retain the end cap 108 of FIG. 6 in place in the roller bearing assembly. It should not be considered as limited solely to railroad bearing applications, however, as this invention may be used in any environment in which it is desirable or necessary to sense the fact that a temperature limit has been reached.

What is claimed is:

1. A temperature indicator comprising:

a first member subject to temperature fluctuations and having a head with a recess extending into said head;

a fluid holding member having a window and disposed within said recess such that said window is visible;

an indicator area and a light-absorbing indicator fluid disposed in said fluid holding member;

said indicator area being separated from said window with at least a portion of said fluid disposed between said indicator area and said window;

means to drain said fluid from the space between said indicator area and said window upon the reaching of a predetermined temperature; whereby said indicator area will be visible through said window at a predetermined temperature thereby giving a visual indication of the fact that such predetermined temperature has been reached.

2. The invention of claim 1 in which said means comprises a melt-out plug disposed in the wall of said fluid holding member and adapted to melt and flow upon the reaching of a predetermined temperature.

3. A temperature indicating fastener comprising in combination:

a fastener member having a head and threads for engagement with another member;

said head having a recess;

a fluid holding member having a window and disposed in said recess in a manner such that said window is visible;

an indicator member at least partially disposed within said fluid holding member, said indicator member having an indicator area adapted to be in engagement with said window with said fastener in an unstressed condition;

light-absorbing indicator fluid disposed within said fluid holding member;

means providing for the movement of said indicator area with respect to said window upon take up of said fastener there being defined a space between said indicator area and said window at such time as said fastener has been taken up an appropriate amount;

light-absorbing indicator fluid occupying said space with said fastener in a stressed condition;

means to evacuate said fluid from said space upon the reaching of a predetermined temperature limit; whereby said indicator area of said indicator member will be visible through said window at a predetermined temperature with said fastener in a stressed condition.

4. The invention of claim 3 in which said means to evacuate said fluid is defined as a melt-out plug in said fluid holding member.

5. The invention of claim 4 in which said melt-out plug is disposed in a bore extending through said indicator member.

6. A temperature indicator comprising:
a body member subject to temperature fluctuations;
a fluid holding member having a window;
said fluid holding member being received by said body member such that said window is visible;
light-absorbing indicator fluid disposed in said fluid holding member;
an indicator area positioned so as to be separated from said window with at least a portion of said fluid disposed between said indicator area and said window;

means to evacuate at least a portion of said fluid from between said indicator area and said window on the reaching of a predetermined temperature at said body member; whereby said indicator area will present an optical appearance through said window at a predetermined temperature of said body member thereby giving a visual indication of the fact that such predetermined temperature has been reached.

7. The invention of claim 6 in which said means to evacuate said fluid is defined as a melt-out plug in said fluid holding member.

8. The invention of claim 6 in which said indicator area is defined by an internal wall of said fluid holding member.

9. The invention of claim 6 in which said indicator area is defined by an indicator member at least partially disposed within said fluid holding member.

10. The invention of claim 9 in which said means to evacuate said fluid is defined as a melt-out plug disposed in a bore extending through said indicator member.

11. A temperature indicating fastener comprising in combination:

a fastener member having a head and threads for engagement with another member;

said head having a recess;

a fluid holding member having a window and disposed in said recess in a manner such that said window is visible;

an indicator member at least partially disposed within said fluid holding member, said indicator member having an indicator area adapted to move from a first position to a second position relative to said window as said fastener member is taken up from an unstressed to a stressed condition;

light-absorbing indicator fluid disposed within said fluid holding member;

the relationship of said light-absorbing indicator fluid to said indicator area being such that there is presented a first optical appearance through said window with said indicator area in said first position and a second optical appearance with said indicator area in said second position;

means to evacuate at least a portion of said light-absorbing indicator fluid from at least a portion of said fluid holding member upon the reaching of a predetermined temperature at said fastener member; whereby the optical appearance at said window is altered at a predetermined temperature thereby giving an indication of the fact that such predetermined temperature has been reached.

12. A temperature indicating fastener comprising in combination:

a fastener member having a head and threads for engagement with another member;

said head having a recess;

a fluid holding member having a window and disposed in said recess in a manner such that said window is visible;

an indicator area positioned relative to said window so as to be moveable from a first position with said fastener member in an unstressed condition to a second position with said fastener member in a stressed condition;

light-absorbing indicator fluid disposed within said fluid holding member;

the relationship of said light-absorbing indicator fluid to said indicator area being such that a first optical appearance is presented through said window with said fastener member in an unstressed condition and a second optical appearance is presented with said fastener in a stressed condition;

means to evacuate at least a portion of said fluid from said fluid holding member upon the reaching of a predetermined temperature at said fastener member; whereby the optical appearance at said window is altered at a predetermined temperature thereby giving a visual indication of the fact that such predetermined temperature has been reached at said fastener member.

* * * * *